Figure 1:
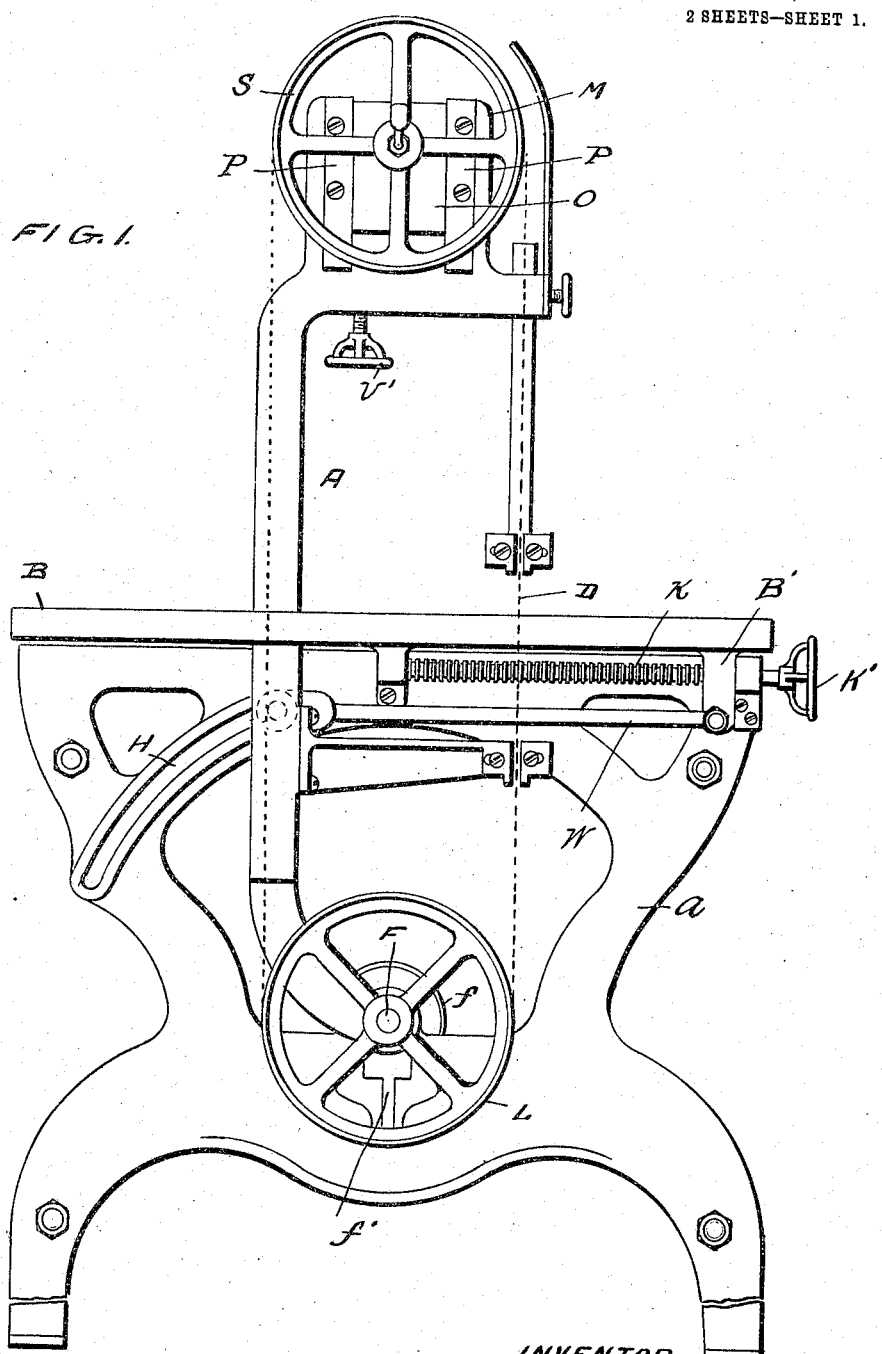

A. ANDERSON.
BAND SAW.
APPLICATION FILED MAR. 25, 1908.

936,596.

Patented Oct. 12, 1909.
2 SHEETS—SHEET 1.

WITNESSES
C. K. Davis
E. L. Corbett

INVENTOR
August Anderson
by Birch Becker & Smith
Attorneys

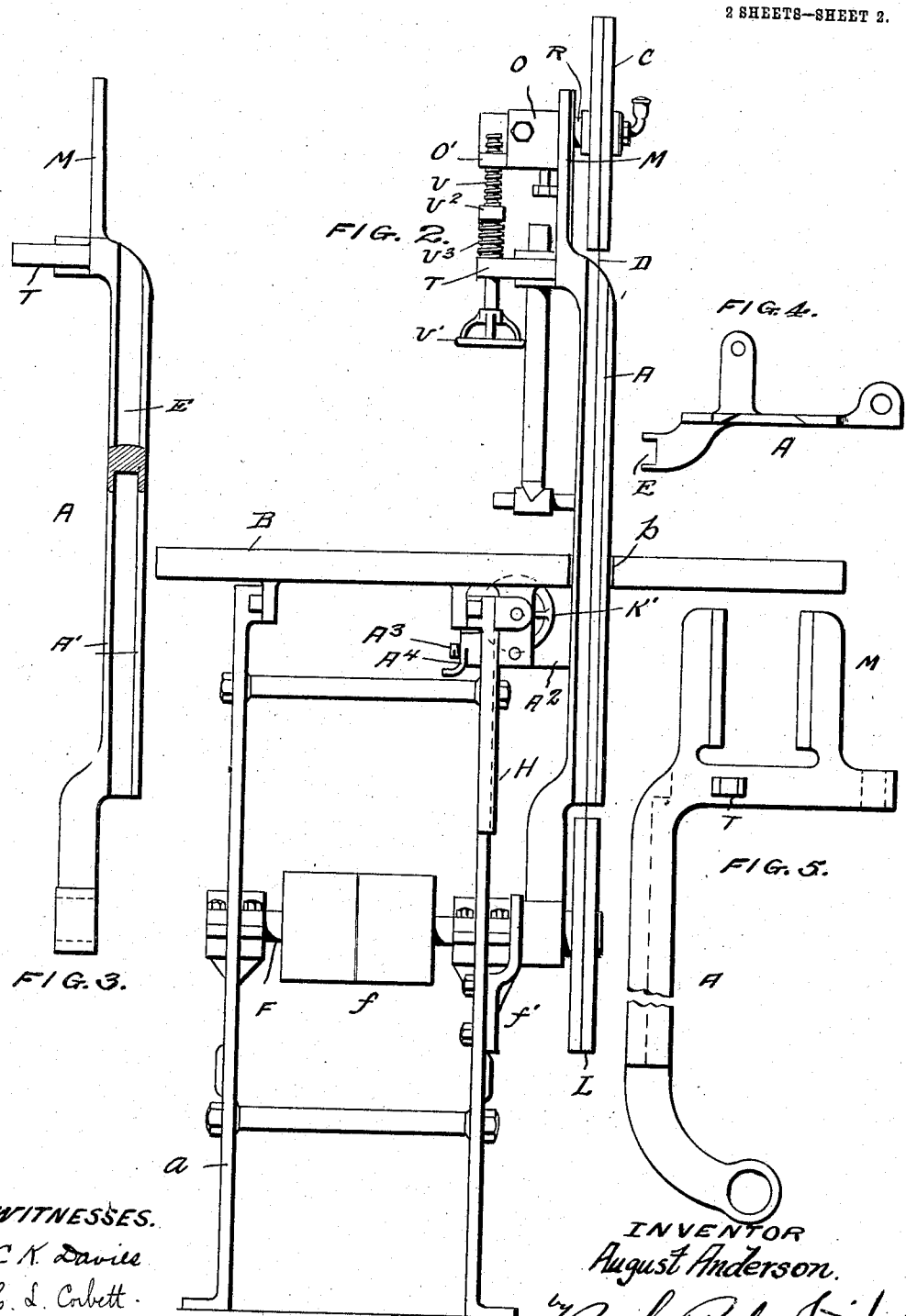

UNITED STATES PATENT OFFICE.

AUGUST ANDERSON, OF WILLIAMSPORT, PENNSYLVANIA, ASSIGNOR OF ONE-THIRD TO CHARLES STEINHILPER AND ONE-THIRD TO JOHN E. FOUCART, OF WILLIAMSPORT, PENNSYLVANIA.

BAND-SAW.

936,596. Specification of Letters Patent. Patented Oct. 12, 1909.

Application filed March 25, 1908. Serial No. 423,220.

*To all whom it may concern:*

Be it known that I, AUGUST ANDERSON, a citizen of the United States, and resident of Williamsport, in the county of Lycoming and State of Pennsylvania, have invented a new and useful Improvement in Band-Saws, of which the following is a specification.

Among the objects of my invention is to provide a guard for one side of a band saw so that the saw may be used on interior work without danger of damaging the same.

The invention further consists in improvements in construction and arrangement as will later appear.

The drawing illustrates one exemplification of the invention.

Figure 1 is a side elevation of the machine, Fig. 2 is an end elevation, Fig. 3 is a view of the post A from the same point of view as Fig. 2 with other parts removed. Fig. 4 is a top view of the post, and Fig. 5 is a right side elevation.

Reference character A designates the frame or standard; B, the table resting on the standard. The table is provided with a slot $b$ to receive the post A and the band saw. Drive shaft F is journaled in the frame and carries drive pulley $f$. The post A is pivotally mounted at its lower end either directly upon shaft F, or upon a tubular stud carried by bracket $f'$ and surrounding the shaft. The adjacent end of shaft F carries the lower or driving band pulley L. The upper end of the post is provided with projections M forming ways in which a bearing block O is movably mounted. Gibs P secured by screws hold the block in position after it has been vertically adjusted. Revolubly mounted in block O is a short shaft R which carries the upper or idle band pulley S. The saw D consisting of a continuous band runs over the pulleys L and S. Post A is provided with a lug T which carries a screw U provided with a hand-wheel U' and engaging a screw thread formed in a lug O' on bearing block O. By turning the hand-wheel the position of the block O in its guides and the tension of the saw D is regulated. Screw U has a collar $U^2$ between which and lug T a spring $U^3$ is compressed, serving to lift block O and related parts and apply tension to the saw.

The post A is provided with flanges A' which form a groove E in which one side of the saw runs. The flanges and the groove defined by them may be of substantially the length of the post or may be shorter, the only requirement being that the groove extends through the table B and for a considerable distance on each side. The side of the saw which lies in the protecting groove E is the ascending side. The descending side is used for cutting in the usual manner. When the saw is being used for interior cuts, that is, for instance, cutting a portion out of a piece of wood which entirely surrounds the saw, or in doing other irregularly shaped work, the protection afforded for the ascending side of the saw by the groove E prevents the saw from coming in contact with and damaging the work.

The frame A is provided with a sector-shaped slot H centered on shaft F, and post A is provided with a lug $A^2$, terminating in a bolt $A^3$ extending through the slot. Post A may be swung back and forth on shaft F as a center and is secured in position by a nut $A^4$ engaging bolt $A^3$ which clamps projection $A^2$ firmly to the sector H. By this means, the angle of the saw to the table, and therefore, the angle of the cut may be varied.

In some cases it is desirable that the table B and post A move together. The drawing shows mechanism for effecting this simultaneous movement. Revolubly mounted on the frame in suitable bearings is a screw K carrying a hand-wheel K'. The table is provided with a lug B' engaging screw K. A link W connects lug B' with the projection $A^2$ carried by post A. When lock nut $A^4$ is loosened hand-wheel K' may be turned, revolving screw K and thus moving table B on its bed in either direction. At the same time link W moves post A through its connection with lug B'. In some cases lock nut $A^4$ may be dispensed with and screw K may be depended upon to hold the adjusted parts in proper position.

I claim:

1. In a band saw, the combination of a frame, a table slidably mounted thereon, a drive shaft, a post pivoted in the frame on the shaft center, and provided with a groove on the side away from the center of the table, a shaft carried by the post, pulleys on the shafts, a band saw running on the pulleys and inclosed by the groove on the post so that the post is between the saw and the center of the table and means for shifting the table and post and securing them in adjusted position.

2. In a band saw, the combination of a frame, a table slidably mounted thereon, a drive shaft, a post pivoted in the frame on the shaft center and provided with a groove on the side away from the center of the table, a shaft carried by the post, pulleys on the shafts, a band saw running on the pulleys and inclosed by the groove on the post so that the post is between the saw and the center of the table, a screw on the frame, a lug on the table engaging the screw and a link connecting the lug and the post.

3. In a band saw, the combination of a frame, a table slidably mounted thereon, a drive shaft, a post pivoted in the frame on the shaft center and provided with a groove on the side away from the center of the table, a shaft carried by the post, pulleys on the shafts, a band saw running on the pulleys and inclosed by the groove on the post so that the post is between the saw and the center of the table, a screw on the frame, a lug on the table engaging the screw, a link connecting the lug and the post, and means for locking the post on the frame in adjusted position.

AUGUST ANDERSON.

Witnesses:
H. RUSSELL HILL,
J. C. HILL.